No. 766,132. PATENTED JULY 26, 1904.
R. BAGGALEY.
SAFETY SHAFT FOR QUICKSAND OR OTHER DANGEROUS GROUND.
APPLICATION FILED APR. 18, 1904.
NO MODEL. 5 SHEETS—SHEET 1.

No. 766,132. PATENTED JULY 26, 1904.
R. BAGGALEY.
SAFETY SHAFT FOR QUICKSAND OR OTHER DANGEROUS GROUND.
APPLICATION FILED APR. 18, 1904.
NO MODEL. 5 SHEETS—SHEET 3.
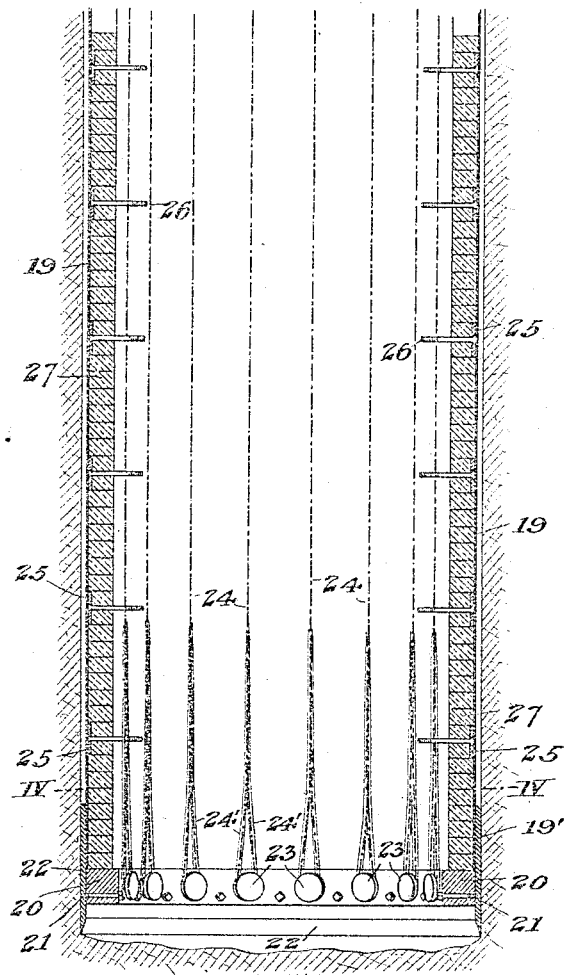
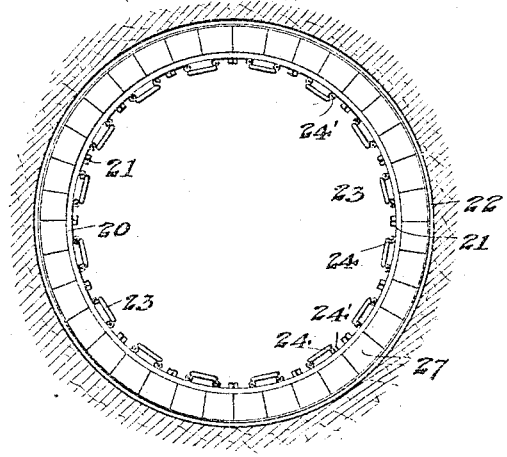
WITNESSES
INVENTOR
Ralph Baggaley No. 766,132. PATENTED JULY 26, 1904.
R. BAGGALEY.
SAFETY SHAFT FOR QUICKSAND OR OTHER DANGEROUS GROUND.
APPLICATION FILED APR. 18, 1904.
NO MODEL. 5 SHEETS—SHEET 4.
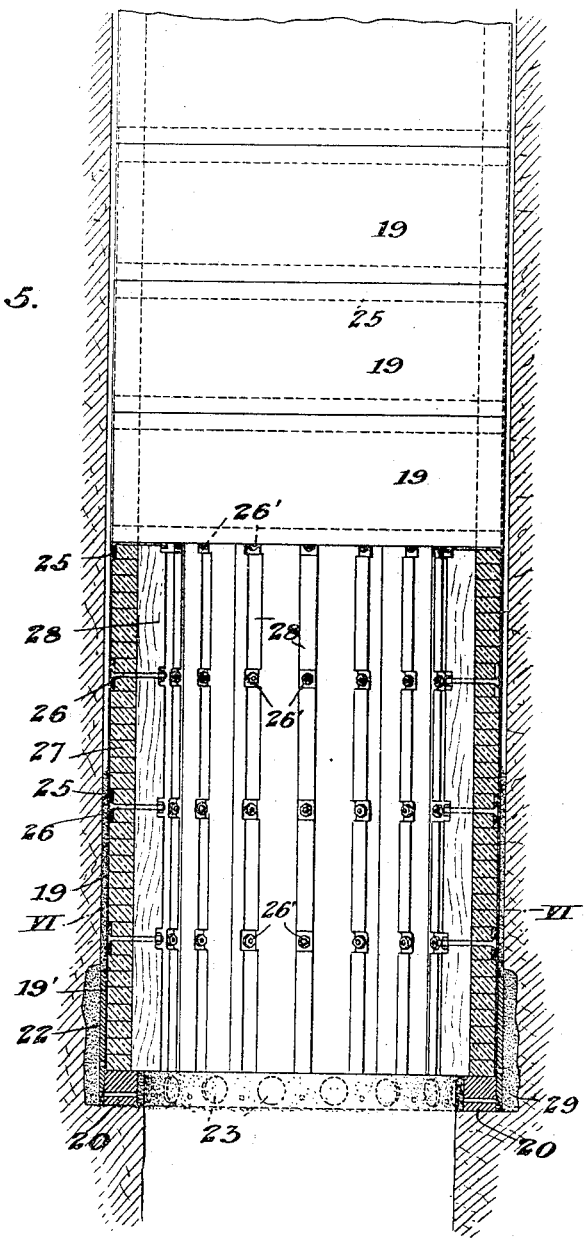
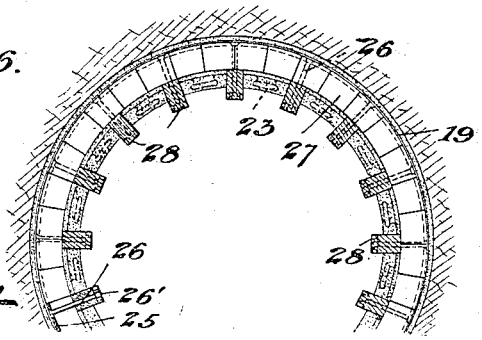
WITNESSES
INVENTOR

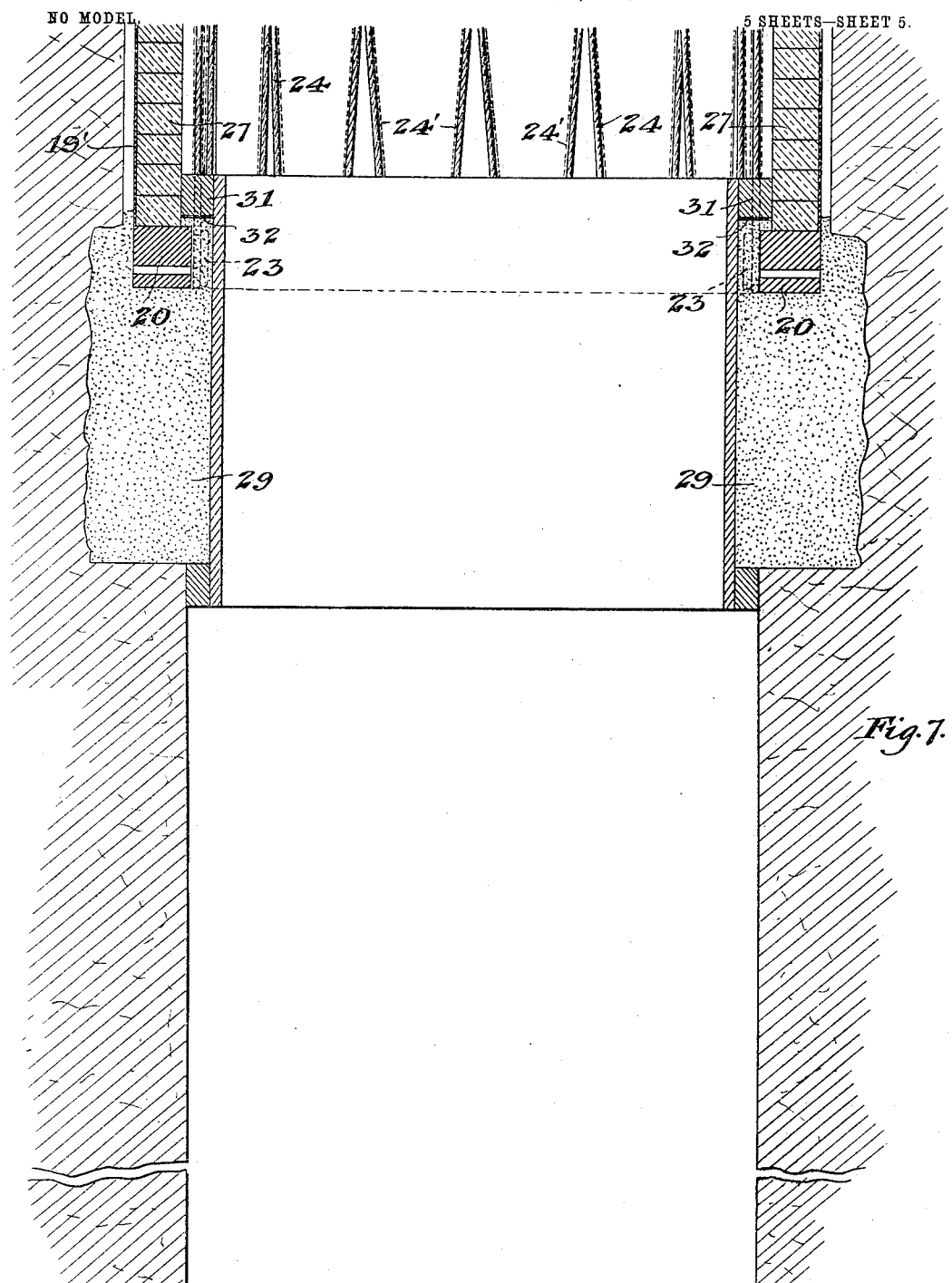

No. 766,132.       Patented July 26, 1904.

UNITED STATES PATENT OFFICE.

RALPH BAGGALEY, OF PITTSBURG, PENNSYLVANIA.

SAFETY-SHAFT FOR QUICKSAND OR OTHER DANGEROUS GROUND.

SPECIFICATION forming part of Letters Patent No. 766,132, dated July 26, 1904.

Application filed April 18, 1904. Serial No. 203,628. (No model.)

*To all whom it may concern:*

Be it known that I, RALPH BAGGALEY, of Pittsburg, in the county of Allegheny and State of Pennsylvania, have invented a Safety-Shaft for Quicksand or other Dangerous Ground, of which the following is a specification, reference being had to the accompanying drawings, in which—

Figure 1:
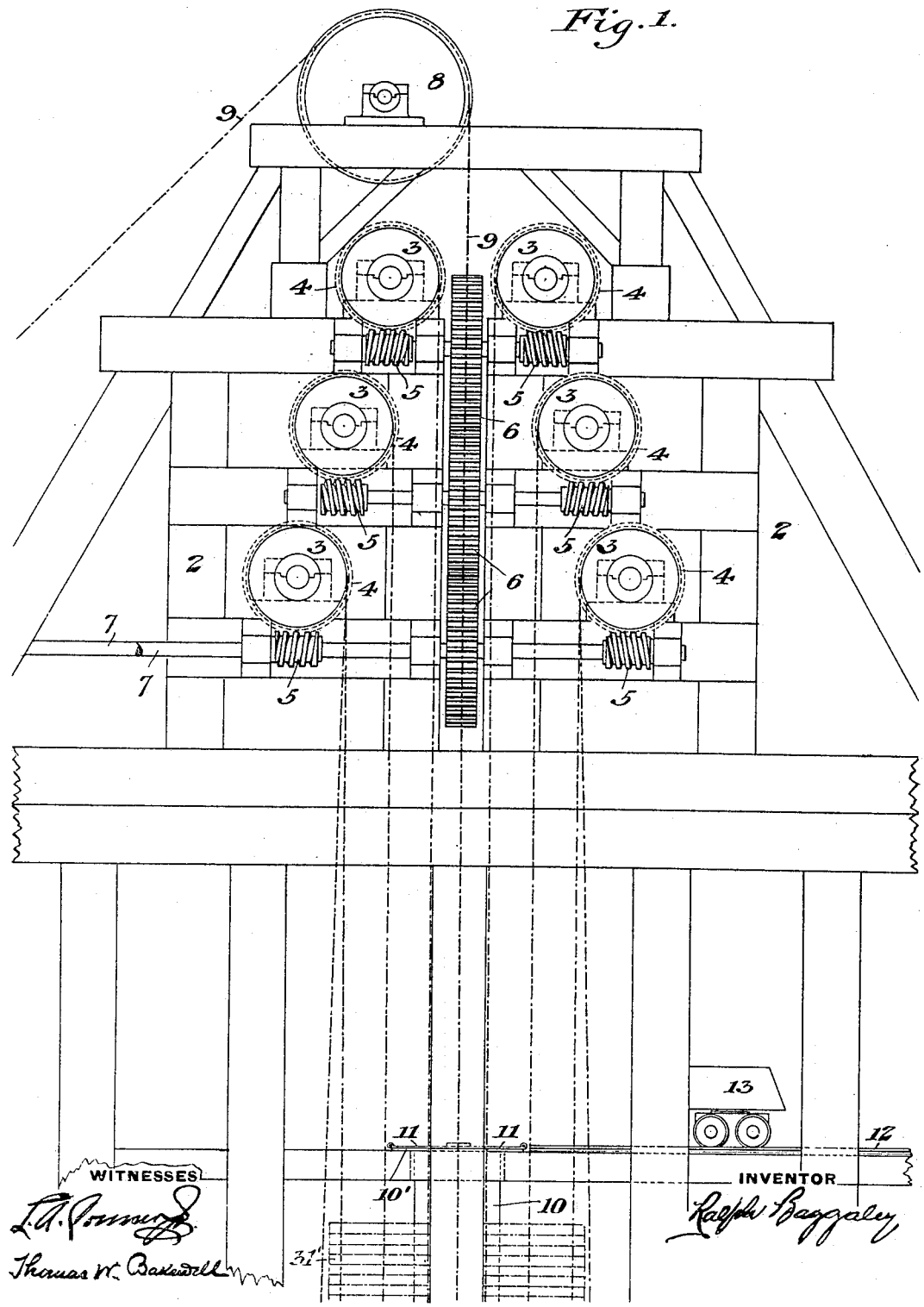
Figure 2:
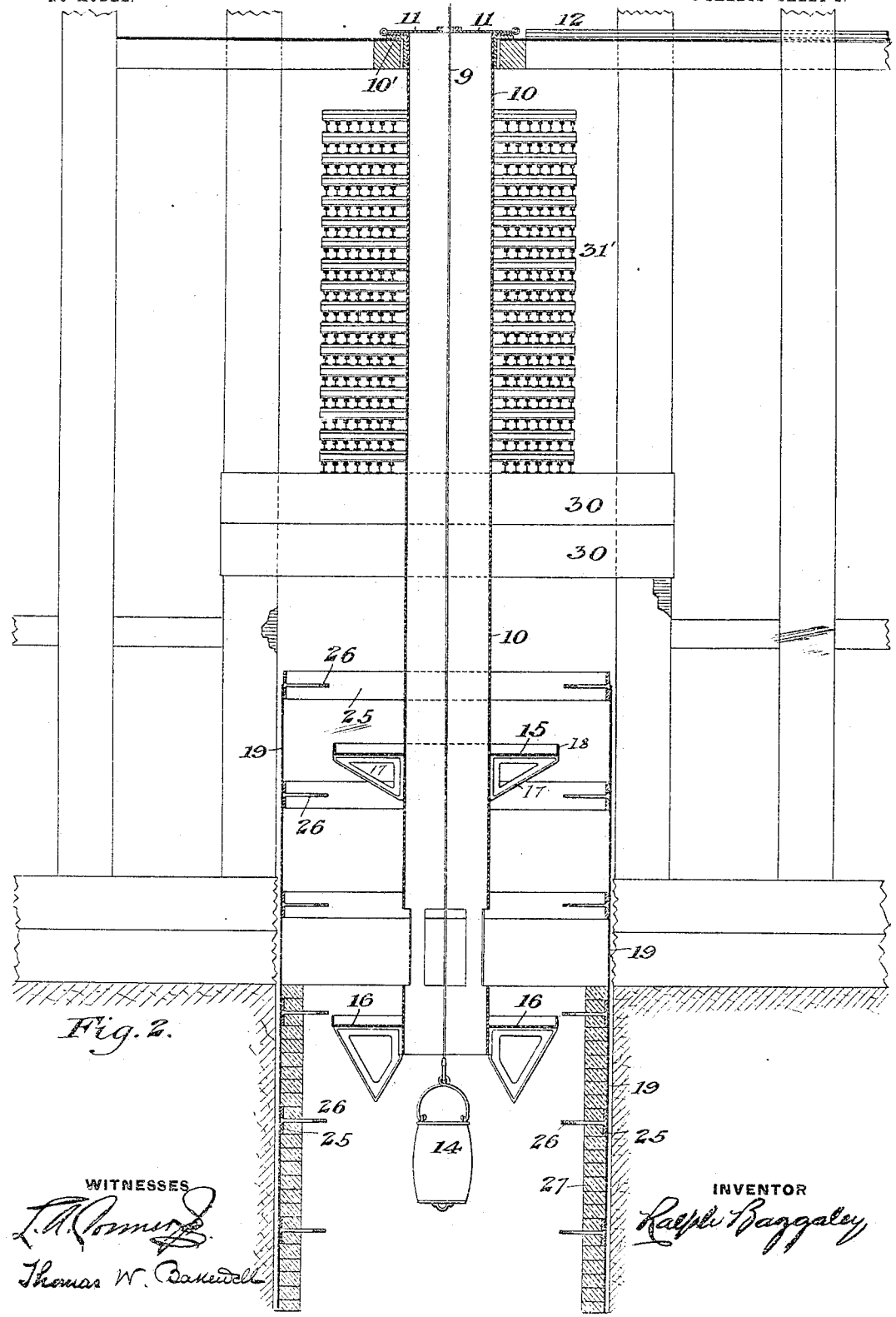

Figure 1 shows in elevation the upper part of the power-frame. Fig. 2 shows in vertical section the part of the apparatus immediately below that shown in Fig. 1. Fig. 3 shows in section the bottom of the apparatus as it is when the shaft is being sunk, Fig. 2 being a continuation of Fig. 1 and Fig. 3 a continuation of Fig. 2. Fig. 4 is a horizontal section on the line IV IV of Fig. 3. Fig. 5 is a view similar to Fig. 3, showing the parts as they are when the bottom of the shaft is reached. Fig. 6 is a horizontal section on the line VI VI of Fig. 5. Fig. 7 is a sectional view showing the shaft-casing ready to be lowered through a bed of plastic hydraulic cement, so as to rest upon the solid rock foundation on which it has its final resting-place.

Great difficulty has been experienced in sinking mine-shafts through strata of quicksand and water on account of the liability of the earth to cave in at the sides or to rise up at the bottom, and in many cases these difficulties have been so serious as to render the work of sinking the shaft impracticable and to cause its abandonment after the expenditure of large sums of money. As an illustration of this fact only one deep shaft has been sunk successfully heretofore on the flats in the Butte mining district, while twelve prominent failures to sink such shafts in that section are recorded. Many methods involving great cost have heretofore been resorted to, such as the freezing method and others, and although these at times are successful their cost is prohibitive. As an illustration of this a shaft sunk in the Menominee iron district of Michigan cost over eleven hundred dollars per foot. The only successful deep shaft sunk to a depth of twelve hundred feet in the Butte flats, where the strata of quicksand and gravel terminated at a depth of six hundred and six feet, cost one hundred and seventy-two thousand dollars, over two-thirds of which was expended in sinking through the quicksand to bed-rock. My invention provides means by which these difficulties can be obviated and by which shafts can be sunk through quicksands and like strata quickly and without the great cost and danger to life which has attended the operation as heretofore conducted.

In the drawings, Figs. 1 and 2, 2 is a strong frame which is built above the place at which the shaft is being sunk. On this frame I journal a series of drums 3 3, each of which carries a worm-wheel 4, meshing with a worm-shaft 5, and these worm-shafts are driven by gearing 6 from a main shaft 7, which leads to the engine, the gearing being arranged so that each of the drums 3 will be rotated in the proper direction and that all will be driven at uniform speed from the same source of power. At the top of the frame is a pulley 8, over which passes a rope 9, carrying at one end a bucket for hoisting material from the shaft and connected at the other end with a hoisting-drum (not shown) situate on the ground and driven by the hoisting-engine.

10 is a tubular column or support through which the rope 9 passes and which is supported at its upper end by a strong flange 10', bearing upon the frame. It is covered by doors 11, and at the level of these doors is the track 12 for the car 13, in which the material raised by the bucket 14 is carried away.

The column 10 carries platforms 15 16, provided for the men who assemble the sheet-metal casing, which I will shortly describe, and who place the bricks or masonry in it as it is lowered into the shaft. These platforms are made strong, so as to support the loads which are placed upon them, and are preferably composed of brackets 17, securely riveted to the column 10 and carrying plates which are hinged or riveted to the column on their inner edges and have upturned flanges 18 at their outer edges to prevent the dropping of material therefrom upon the miners working below.

The upper platform 15 is for the iron-workers, who apply the sections of the casing, and the lower platform 16 is for the bricklayers, who lay the bricks therein and who preferably receive their supplies of brick or mortar through apertures in the casing by means of the bucket above described.

The casing just mentioned consists of a sheet-metal cylinder, which as the shaft is sunk is attached or built up in sections 19, each preferably about four feet in height, the diameter of the casing being nearly the same as the diameter of the shaft.

The bottom section 19', which is first lowered in the shaft, rests upon a very strong metal ring 20, which is fixed detachably from the inside by cap-screws 21 to an annular steel cutting-plate 22. The ring 20 carries a number of strong steel heads or buttons 23, to each of which is attached a supporting-cable 24, and these cables (of which the drawings show sixteen) extend to the drums 3, from which they are unwound simultaneously. There are six drums and sixteen cables. Two of the drums carry four cables, and each of the remaining four drums carries two cables.

The sections 19 of the metal casing are secured together at their ends by annular bands 25, riveted to the interior of the casing and having inwardly-projecting bolts 26, whose heads are countersunk in the bands, as shown, so that when the sections are joined together they afford a smooth exterior surface, which offers no obstructions to the lowering of the casing through the quicksand. The inwardly and radially projecting bolts 26 are designed to hold the vertical timbering of the shaft, as shown in Fig. 6 and explained below.

The operation of the device when used in sinking a shaft is as follows: When the miners reach a quicksand requiring the use of my invention, the frame, with the drums and gearing above described, together with the vertical column 10 and the platforms 15 16, are set in place, and the supporting-ring 20, carrying the cutter-plate 22, is secured to the lower end of the cables 24 and is lowered by rotation of the drums. The lower portion of each cable is protected up to any desired height by a metal band 24', curved in cross-section, which prevents injury to the cable from blasting. This protecting-covering incases the cable and is attached to it with suitable clamps or bands. When the ring 20 is lowered to the platform 15, the iron-workers place upon it a section 19, and as it is lowered farther they apply other sections 19, securing them together with internal riveted bands 25, as above explained. When the supporting-ring 20 comes to the level of the platform 16, the bricklayers build upon it an annular wall 27 of bricks, which are preferably made from the slag of a smelter plant, for the reason that such bricks are cheap and easy to obtain in the vicinity of mines and because they are vitrified and impervious to water and are considerably heavier and stronger than ordinary bricks of clay. The metal casing is thus lowered step by step, sections added to it at the platform 15, and the brick wall continued to be built at the platform 16 until finally its lower end, carrying the cutter 22, reaches and rests upon the bottom of the shaft, as shown in Fig. 5.

The bricks are laid in hydraulic cement, so as to constitute a solid circular wall, and when the shaft is ultimately sunk to its final position it is strong enough to resist the great pressure applied to it by the strata of quicksand and gravel and tight enough to exclude all surface water from the shaft. It is this cemented brick wall which is the permanent portion of the structure, for the metal casing is quickly attacked by the corrosive waters usually found in mining districts and may be destroyed in a few weeks, leaving the brick wall alone to constitute the casing and to resist the strains. It must therefore be well and carefully built of indestructible materials. The function of the metal casing is to hold the brick wall while the shaft is being sunk through the quicksand, to furnish a solid circular guide to which the bricklayers work in laying the brick, to afford a smooth exterior surface which will go through the quicksand and to hold the radial bolts 26 until the brick wall has been built.

As the brick wall is built vertical timbers 28 may be applied to its inner face and are held by the bolts 26, which pass through the timbers, and by nuts 26', which are fitted on the bolts in countersunk holes.

When the structure is hanging within the shaft or when it is resting in the bottom of the shaft, as shown in Fig. 5, it does not interfere with the work of the miners, for all of the cables and the working parts are at the periphery of the casing, as shown in Fig. 4, and its interior is quite open. The miners are therefore free to dig out the shaft at the bottom and to send the earth to the surface in the hoisting-bucket. There is also plenty of space thus afforded for the sinking-pumps to hang at the sides of the shaft without obstructing the miners in their work.

In places where the quicksand is so soft as to rise within the shaft because of the great external pressure that is thus afforded a vent the operator simply lowers the shell steadily downward, adding sections to it and applying the brick wall, as above described, until such time as it has descended as far as it will go, whereupon the metal and brick casing will hold back the sand, and the pumps are again lowered into position, the water is pumped out, and the miners can then remove the soft material from its interior until they again reach the bottom, whereupon they proceed to dig out the earth, as indicated in Fig. 3, and to lower the casing until bed-rock is reached. The lowering of the shaft shuts out the surrounding quicksand, and the stoppage of the shaft in its downward movement will indicate that the cutter-plate has been firmly embedded in solid ground and that outside water has been thus shut out, so that the miners can again excavate in the bottom with safety after the accumulated water has been pumped out. The miners then continue to sink the shaft for a considerable distance until solid rock free from seams, fissures, and broken rock is reached—say for fifty feet, more or less, below the bedrock level—and they then excavate an enlarged space around the shaft, as shown in Fig. 7. This is done before the casing is lowered within the solid rock, as the blasting might injure the cables and the casing. A large annular wooden box or frame is then placed within the excavated space and projects inwardly somewhat within the shaft. It has at its ends marginal wooden rings 31, adapted to fit, respectively, against the wall of the shaft below and against the inner face of the brick wall above, a packing-ring 32, of rubber, being provided at the upper piece 31 to engage the wall and to confine the cement when the casing is being lowered into the box. The box is filled with a mass of plastic hydraulic cement, the mass of which may weigh several tons. The cap-screws which hold the cutter 22 to the metal ring 20 are then unscrewed inwardly, and the entire casing, with its contained brick wall, is then lowered into the box and within the body of cement, which is displaced upwardly thereby back of the casing, filling the intervening space between the casing and rock. When the casing is thus lowered into the body of cement, the ring 20 moves down within the cutter-plate 22, which, in effect, is pushed upon the exterior of the casing and is therefore left permanently in the shaft, or it may be dropped to the bottom of the shaft and then removed in sections before the casing is lowered. As the mass of plastic cement will flow under the pressure of the descending shaft in the direction of least resistance, the box and rubber gasket will force it up the outside of the casing, where it will find a permanent lodgment between the casing and the rock and will thus form a permanent water-tight seal against the entrance of surface drainage. The iron at the bottom of the casing will be entirely enveloped and permanently sealed in a thick envelop of cement, which when hardened will be air and water tight and will permanently exclude surface water and hold the brick casing and shaft in position. When the casing rests on its foundation and the cement has set, the box and the cement facing on the inside of the brick casing are removed, so as to expose the cables, and when the cables have been detached after removing their protective metal sheaths the surface of the iron on the interior of the shaft should be coated and sealed with cement in order to protect it against oxidation and the corrosive mine-waters. The vertical guide-timbers for the cages are then attached to the timbers 28, and the brick wall is left in the shaft as a permanent casing, which will exclude water and effectually prevent twisting of the shaft or the caving of the earth, because any outside pressure will be resisted by a strong vitrified impervious circle. The column 10, the drums, their associated parts, and the frame 2 are then detached and taken away.

If at any time during the lowering of the casing into the shaft its friction on the sides should cause it to stick and prevent it from being carried down by the weight of its parts and the brick wall which is built in it, I may force it down by jacks set between the top of the brick wall and timbers 30, which are held down by heavy weights 31' and afford resistance to the jacks, enabling them to press down upon the casing with the required force. The weight may consist of railroad-iron or other convenient material and is applied to the extent required for resistance to the jacks, whatever this may prove to be. I prefer to support the timbers loosely on the frame 2, so that the upward pressure of the jacks will be resisted only by these timbers and by the superimposed weights 31', which are intended to be supplied should the work demand them and only to the extent necessary to start the casing again downward.

The advantages of my invention will be appreciated by those skilled in the art. It reduces very greatly the cost of sinking shafts through quicksand, water, and gravel, enables shafts to be sunk in many places where it has not hitherto been practicable, and renders safe a work which has been attended with the greatest danger and loss of life. It enables shafts to be sunk quickly and straight without the danger of twisting or jackknifing which has hitherto existed, and when the work is completed it effectually excludes surface water from the shaft, and thus saves pumping, which in the working of most mines is a matter of great cost and trouble. It also greatly reduces the cost of any shaft sunk through dangerous ground, and where more than one shaft is required the second or subsequent ones may be sunk for a fraction of the present cost by the repeated use of the same apparatus.

Those skilled in the art will be able to modify my invention in many ways without departing from the principles thereof, since

What I claim is—

1. Means for sinking shafts, comprising a casing composed of sections adapted to be successively attached, supporting-cables, and a wall which is built within the casing as it is lowered; substantially as described.

2. Means for sinking shafts, comprising a casing composed of sections adapted to be successively attached, supporting-cables, and a tight cemented wall which is built within the casing as it is lowered; substantially as described.

3. Means for sinking shafts, comprising a casing composed of sections adapted to be successively attached, supporting-cables, and a wall which is built within the casing as it is lowered, said casing having a cutting portion at its end; substantially as described.

4. Means for sinking shafts, comprising a strong supporting-ring, cables attached thereto, a sectional casing thereon, said ring affording a support for a wall built within the casing; substantially as described.

5. Means for sinking shafts, comprising a supporting-ring, a casing composed of sections adapted to be successively attached, supporting-cables, a wall which is built within the casing as it is lowered, and a cutter detachably secured to the ring; substantially as described.

6. Means for sinking shafts, comprising a casing composed of sections adapted to be successively attached, supporting-cables, and a wall which is built within the casing as it is lowered, the sections of said casing being attached by internal riveted bands; substantially as described.

7. Means for sinking shafts, comprising a casing composed of sections adapted to be successively attached, supporting-cables, and a wall which is built within the casing as it is lowered, and timber-securing bolts projecting radially from the casing and having countersunk heads; substantially as described.

8. Means for sinking shafts, comprising a casing composed of sections adapted to be successively attached, supporting-cables, and a wall which is built within the casing as it is lowered, timber-securing bolts projecting from the casing, and timbers secured thereby inside the wall; substantially as described.

9. Means for sinking shafts, comprising a casing composed of sections adapted to be successively attached, supporting-cables, a tight cemented wall which is built within the casing as it is lowered and a cement foundation set at the base of the cased portion of the shaft into which the foot of the structure is lowered and by which it is held water-tight; substantially as described.

10. Means for sinking shafts, comprising a casing composed of sections adapted to be successively attached, supporting-cables, and a tight cemented wall which is built within the casing as it is lowered, and a cement foundation set within a temporary box at the base of the cased portion of the shaft into which the foot of the structure is lowered, and by which it is held water-tight; substantially as described.

11. Means for sinking shafts, comprising a casing composed of sections adapted to be successively attached, supporting-cables, and a wall which is built within the casing as it is lowered, and has a smooth and even exterior; substantially as described.

12. Means for sinking shafts, comprising a casing composed of sections adapted to be successively attached, supporting-cables, a wall which is built within the casing as it is lowered, and a bed of cement for the foot of the casing; substantially as described.

13. Means for sinking shafts, comprising a strong supporting-ring, cables attached thereto, a sectional casing thereon, said ring affording a support for a wall built within the casing, and a bed of cement embedding the foot of the casing; substantially as described.

14. Means for sinking shafts, comprising a strong supporting-ring, cables attached thereto, a sectional casing superposed thereon, said ring affording a support for a wall built within the casing, and a bed of cement in which the foot of the casing is embedded and which is displaced upwardly behind the casing; substantially as described.

15. Means for sinking shafts, comprising a casing composed of sections adapted to be successively attached, supporting-cables, and a wall which is built within the casing as it is lowered, a frame and a weighted resistance-piece against which to exert down pressure; substantially as described.

16. Means for sinking shafts, comprising a casing, a frame, a series of drums, means for rotating them simultaneously and at equal speed, and cables connecting the casing to the drums; substantially as described.

17. Means for sinking shafts, comprising a sectional casing, a frame, a hollow column through which hoisting apparatus passes, and platforms on the column; substantially as described.

18. Means for sinking shafts, comprising a sectional casing, a frame, a hollow column through which hoisting apparatus passes, platforms on the column, and a cover for the column; substantially as described.

19. Means for sinking shafts, comprising a strong supporting-ring, cables attached thereto, a sectional casing, said ring affording a support for a wall built within the casing, and holding devices on the ring for attachment of cables; substantially as described.

20. Means for sinking shafts, comprising a casing composed of sections adapted to be successively attached, supporting-cables, a wall which is built within the casing as it is lowered, and protecting-sheaths for the cables; substantially as described.

21. Means for sinking shafts, comprising a casing composed of sections adapted to be successively attached, supporting-cables, and a wall which is built within the casing as it is lowered, a series of drums for the cables, and worm-gearing by which the drums are driven simultaneously and at an equal rate; substantially as described.

In testimony whereof I have hereunto set my hand.

RALPH BAGGALEY.

Witnesses:
 J. H. REED,
 THOMAS W. BAKEWELL.